(12) United States Patent
Lloyd

(10) Patent No.: US 8,746,305 B2
(45) Date of Patent: Jun. 10, 2014

(54) ROTATING SEAL ASSEMBLY FOR TIRE INFLATION SYSTEM

(75) Inventor: Jeffrey M. Lloyd, Auburn Hills, MI (US)

(73) Assignee: Arvinmeritor Technology, LLC, Troy, MI (US)

( * ) Notice: Subject to any disclaimer, the term of this patent is extended or adjusted under 35 U.S.C. 154(b) by 400 days.

(21) Appl. No.: 13/160,570

(22) Filed: Jun. 15, 2011

(65) Prior Publication Data

US 2012/0318422 A1    Dec. 20, 2012

(51) Int. Cl.
  *B60C 23/00* (2006.01)
  *F16L 27/00* (2006.01)
(52) U.S. Cl.
  USPC .............................. 152/417; 285/272; 285/94
(58) Field of Classification Search
  USPC .............. 152/417, 416, 415; 301/137, 105.1, 301/124.1
  See application file for complete search history.

(56) References Cited

U.S. PATENT DOCUMENTS

| | | | |
|---|---|---|---|
| 1,794,900 A | 3/1931 | Hutchinson | |
| 3,331,638 A | 7/1967 | Fruth | |
| 4,335,283 A | 6/1982 | Migrin | |
| 4,434,833 A | 3/1984 | Swanson et al. | |
| 4,724,879 A | 2/1988 | Schultz et al. | |
| 4,782,878 A | 11/1988 | Mittal | |
| 4,844,138 A * | 7/1989 | Kokubu | 152/417 |
| 4,883,106 A | 11/1989 | Schultz et al. | |
| 4,895,199 A | 1/1990 | Magnuson et al. | |
| 4,924,926 A | 5/1990 | Schultz et al. | |
| 4,938,272 A | 7/1990 | Sandy, Jr. et al. | |
| 5,253,687 A | 10/1993 | Beverly et al. | |
| 5,287,906 A | 2/1994 | Stech | |
| 5,377,736 A * | 1/1995 | Stech | 277/414 |
| 5,584,949 A | 12/1996 | Ingram | |
| 5,769,979 A | 6/1998 | Naedler | |
| 6,131,631 A | 10/2000 | Bradley et al. | |
| 6,250,327 B1 | 6/2001 | Freigang et al. | |
| 6,394,159 B1 | 5/2002 | Cobb | |
| 6,425,427 B1 | 7/2002 | Stech | |
| 6,474,383 B1 | 11/2002 | Howald et al. | |
| 6,698,482 B2 | 3/2004 | Hennig et al. | |
| 6,871,683 B2 | 3/2005 | Cobb | |
| 6,880,598 B2 | 4/2005 | Haunhorst et al. | |

(Continued)

FOREIGN PATENT DOCUMENTS

DE    2540240 A1    3/1977

OTHER PUBLICATIONS

EP Search report dated Aug. 31, 2012 for EP 12 17 2083.

*Primary Examiner* — Glenn Dayoan
*Assistant Examiner* — Sunsurraye Westbrook
(74) *Attorney, Agent, or Firm* — Brooks Kushman P.C.

(57) ABSTRACT

A connector for a tire inflation system includes a body with an air inlet receiving pressurized air from an air supply and an air outlet to communicate the pressurized air to at least one tire. The body is to be connected to a rotating wheel component and includes an internal cavity connecting the air inlet to the air outlet. A seal assembly is positioned within the internal cavity. A tube has a first end supported by the seal assembly and a second end that is to be coupled to a non-rotating axle component. The seal assembly and tube are rotatable relative to each other and seal assembly is rotatable relative to the body. The tube communicates pressurized air from the non-rotating axle component to the air inlet to inflate the tire as needed.

21 Claims, 5 Drawing Sheets

(56) References Cited

U.S. PATENT DOCUMENTS

| | | |
|---|---|---|
| 7,051,585 B2 | 5/2006 | Claussen et al. |
| 7,185,688 B2 | 3/2007 | Hayes et al. |
| 7,207,365 B2 * | 4/2007 | Nelson et al. ............... 152/417 |
| 7,418,989 B2 * | 9/2008 | Ingram ..................... 152/417 |
| 7,690,412 B1 | 4/2010 | Jenkinson et al. |
| 7,931,061 B2 | 4/2011 | Gonska et al. |
| 7,967,045 B2 | 6/2011 | Jenkinson et al. |
| 2004/0000364 A1 | 1/2004 | Hennig |
| 2005/0194079 A1 | 9/2005 | Hennig |
| 2006/0018766 A1 | 1/2006 | Stanczak |
| 2011/0162773 A1 | 7/2011 | Gonska et al. |

* cited by examiner

ROTATING SEAL ASSEMBLY FOR TIRE INFLATION SYSTEM

TECHNICAL FIELD

The subject invention relates to a seal assembly for a tire inflation system.

BACKGROUND OF THE INVENTION

Over time, tires inherently loose air pressure through permeation and leaks. Tire inflation systems monitor this pressure loss and act to supply air to under-inflated tires as needed. Once the tires are inflated to a proper pressure level, the tire inflation system continues to monitor and maintain proper tire pressure to maximize the life of the tire.

In one known configuration, the tire inflation system communicates compressed air through a non-rotating component, such as an axle housing for example, into a rotating component, which is connected to the tire. Typically, the rotating component comprises a thru-tee connector that is attached to a hub cap. Difficulties arise when communicating pressurized air through this type of rotating connection.

SUMMARY OF THE INVENTION

A connector for a tire inflation system includes a body with an air inlet receiving pressurized air from an air supply and an air outlet to communicate the pressurized air to at least one tire. The body is to be connected to a rotating wheel component and includes an internal cavity connecting the air inlet to the air outlet. A seal assembly is positioned within the internal cavity. A tube has a first end supported by the seal assembly and a second end that is to be coupled to a non-rotating axle component. The seal assembly and tube are rotatable relative to each other and seal assembly is rotatable relative to the body. The tube communicates pressurized air from the non-rotating axle component to the air inlet to inflate the tire as needed.

In one example, the connector includes an internal lubrication compartment positioned outboard of the internal cavity. The connector includes an outboard end face having at least one opening to supply lubrication to the internal lubrication compartment. The opening receives a detachable plug to hold the lubrication within the internal lubrication compartment.

In one example, the connector includes a plurality of vent holes extending from the internal lubrication cavity to the outboard end face. The vent holes are circumferentially spaced apart from each other about the opening. The plug includes a flexible flange formed about an outer peripheral surface of the plug. The flexible flange portion overlaps the plurality of vent holes.

In one example, the seal assembly comprises a seal body including at least one curved surface portion that abuts against a corresponding curved surface portion formed within the internal cavity of the connector.

In one example, the seal body comprises first and second pieces that are secured together. One of the first and second pieces includes an abutment that retains the tube within the seal body such that the tube cannot be axially disconnected from the seal body. A secondary seal can be mounted within the first and second pieces to seal the tube within the seal body.

These and other features of the present invention can be best understood from the following specification and drawings, the following of which is a brief description.

DETAILED DESCRIPTION OF THE PREFERRED EMBODIMENT

Figure 1:
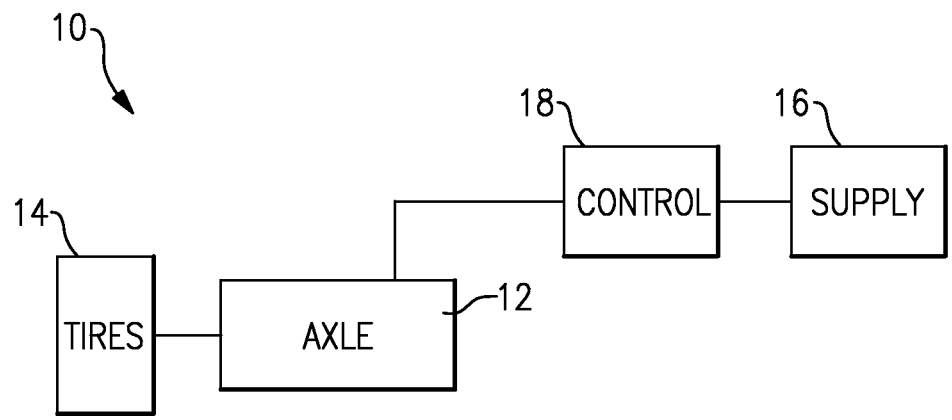
FIG. 1 is a schematic representation of a tire inflation system.

FIG. 1 shows a tire inflation system 10 that supplies pressurized air to an axle 12, which in turn supplies pressurized air to one or more tires 14 as needed to maintain a desired tire pressure. The axle 12 receives pressurized air from an air supply 16. The subject tire inflation system 10 can be used with any type of axle such as a non-drive axle, drive axle, steer-axle, non-steer axle, etc., for example. The air supply 16 can be a dedicated air supply or can comprise an existing air supply already utilized on the vehicle, such as an air supply for vehicle brakes for example.

The tire inflation system 10 includes a control 18 that monitors tire pressure and acts to supply air to the tires 14 when the tires 14 become under-inflated, i.e. when tire pressures fall below a desired pressure level. The control 18 includes appropriate structures and program algorithms that are used to determine when air is to be supplied to the tires 14 and which are used to control the amount of air supplied as known. The control 18 can be automatically activated via an electronic control unit or other similar device to control the amount of air supplied, or the control 18 can be manually actuated by a vehicle operator. The control 18 can include various valves, sensors, pressure regulators, etc. as known to control distribution of the air from the air supply 16. The control 18 is also configured to stop supplying air to a tire 14 if pressure falls below a certain level to prevent the air source 16 from being depleted of air, such as when a tire 14 has experienced a blow-out for example.

Figure 2:
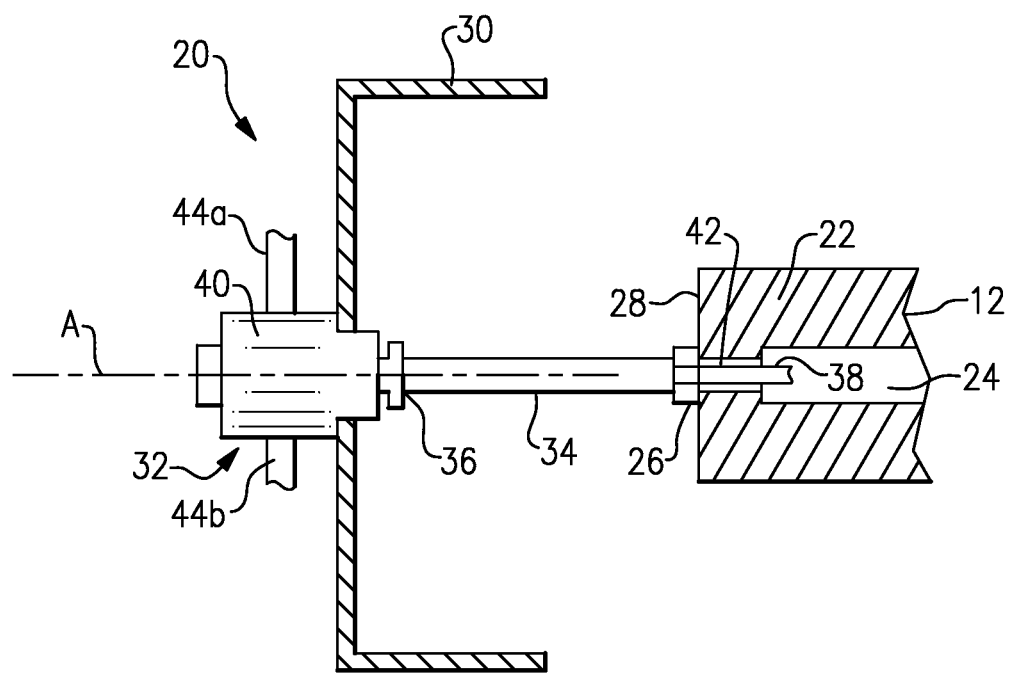
FIG. 2 is a schematic view, in partial cross-section, of one example of a wheel end assembly as used with the tire inflation system.
Figure 3:
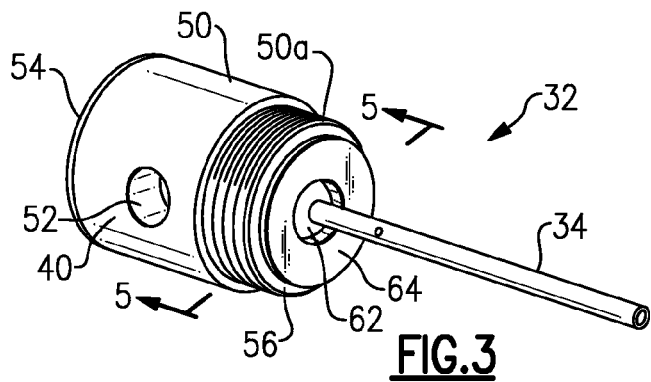
FIG. 3 is a perspective view from an inboard end of a connector as used in the tire inflation system.
Figure 4:
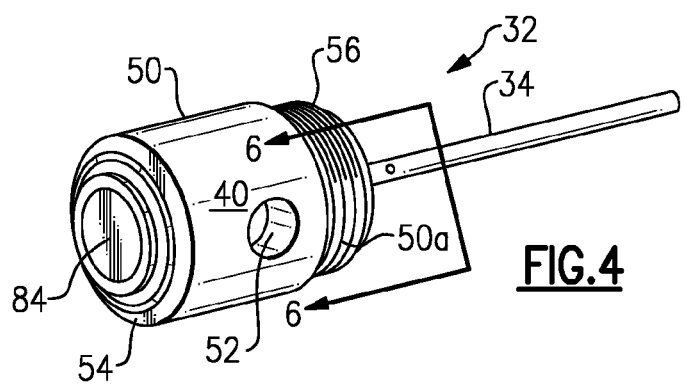
FIG. 4 is a perspective view of the connector of FIG. 3 from an outboard end.

The control 18 supplies air to a non-rotating component, in this example the axle 12, which includes passages that direct the pressurized air toward the rotating tire 14. FIG. 2 shows one example of a wheel end assembly 20 as used with the tire inflation system 10. The axle 12 includes an axle housing 22 within an internal cavity 24 that directs pressurized air to an axle outlet 26 at an end face 28 of the axle housing.

The wheel end assembly 20 includes a hub cap 30 that is mounted for rotation with the tire 14 about an axis A. A connector 32 is used to fluidly connect the non-rotating axle housing 22 to the rotating hub cap 30. The connector 32 provides a sealed interface that allows pressurized air to be communicated from a non-rotating component to a rotating component without leaking.

The connector 32 includes a tube 34 that has a first tube end 36 and a second tube end 38. In one example, the tube is made from a stainless steel material; however, other materials could also be used. The first tube end 36 comprises an outboard end and the second tube end 38 comprises an inboard end. The term "outboard" refers to a direction that faces away from a vehicle center and the term "inboard" refers to a direction that faces toward a vehicle center. The first tube end 36 is supported within a connector body 40 and the second tube end 38 is supported within a seal assembly 42 associated with the axle housing 22. The tube 34 rotates within the seal assembly 42. First 44*a* and second 44*b* hose connections are coupled to the connector body 40 to communicate the pressurized air from the connector 32 to the tires 14 as known. Typically, each wheel end assembly 20 includes a pair of tires, one inboard tire and one outboard tire, and the first hose 44*a* supplies air to one of the tires and the second hose 44*b* supplies air to the other tire.

As shown in FIGS. 3-6, the connector body 40 includes an outer peripheral surface 50 that includes a pair of air outlets 52 that are coupled to the first 44*a* and second 44*b* hoses. The connector body 40 has an outboard end face 54 and an inboard end face 56. The air outlets 52 are located between the inboard 56 and outboard 54 end faces. The body 40 includes an air inlet 58 that is at the inboard end face 56.

In one example, the outer peripheral surface 50 has a threaded portion 50*a* about an inboard end of the body 40 such that the connector 32 can be threadably attached to the hub cap 30. Other attachment methods could also be used to secure the connector 32 to the hub cap 30.

Figure 5:
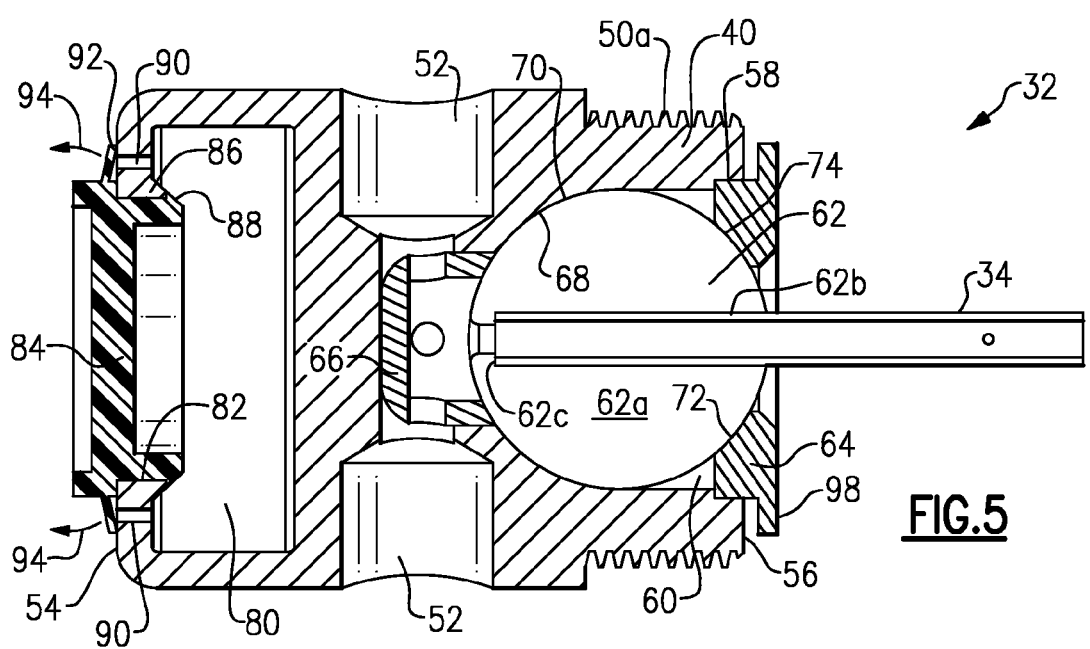
FIG. 5 is a cross-section of the connector of FIG. 3 taken along lines 5-5 as indicated in FIG. 3.
Figure 6:
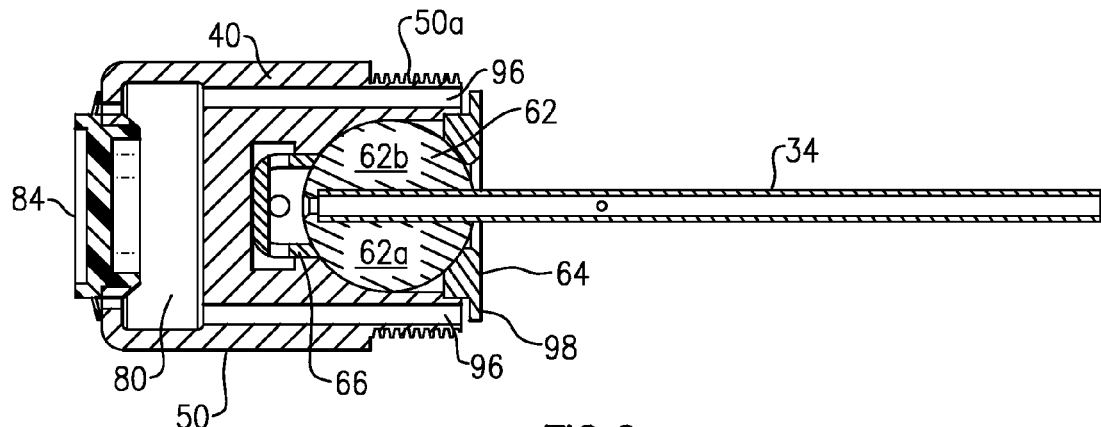
FIG. 6 is a cross-section of the connector of FIG. 3 taken along lines 6-6 as shown in FIG. 4.

As shown in FIG. 5, the body 40 includes an internal cavity 60 that interconnects the air inlet 58 at one end to the air outlets 52. A seal assembly 62 is at least partially received within the internal cavity 60. A retainer 64 is positioned at the air inlet 58 and is pressed into internal cavity 60 at the inboard end face 56 to securely hold the seal assembly 62 within the internal cavity 60. A second seal 66 is positioned on an outboard side of the seal assembly 62 at an interface that fluidly connects to the air outlets 52.

The first tube end 36 is supported within the seal assembly 62 such that the seal assembly 62 and tube 34 can rotate relative to each other. The seal assembly 62 includes a curved outer surface 68 that abuts directly against a curved surface portion 70 formed within the internal cavity 60. In one example, the curved outer surface 68 comprises a spherical surface. This seal contact configuration allows the seal assembly 62 to rotate within the body 40 as needed to accommodate tolerance stack-up issues that can arise once the various components are assembled together.

The curved outer surface 68 comprises a first surface portion that directly engages the body 40. The seal assembly 62 also includes a curved surface portion 72 that directly engages a corresponding curved surface 74 formed on an inboard end of the retainer 64. The retainer 64 is held fixed to the body 40 by a press-fit or other type of connection interface. The curved surface portion 72 allows the seal assembly to rotate relative to the retainer 64 as needed. As such, this ball and socket type connection interface between the connector body 40 and the seal assembly 62 provides another degree of freedom of movement to accommodate a wide range of tolerance stack-ups such as runout between the hub and axle, for example.

The body 40 also includes an internal lubrication chamber 80 that is positioned outboard of the internal cavity 60. The lubrication chamber 80 is fluidly separated from the air outlets 52, the internal cavity 60, and the air inlet 58. At least one opening 82 is formed within the outboard end face 54 of the connector body 40. In the example shown, the at least one opening 82 comprises an enlarged central opening.

A plug 84 is detachably secured to the body 40 to allow lubricant to be added to the lubrication chamber 80 as needed. The plug 84 is formed from a resilient material that allows the plug 84 to be repeatedly attached and detached from the connector 32 in a simple manner. A flange portion 86 is formed about the opening 82 inside the lubrication chamber 80. The plug 84 includes an internal lip 88 that snaps over this flange portion 86 to hold the plug 84 securely in place.

A plurality of vent holes 90 extend from the internal lubrication chamber 80 to the outboard end face 54 of the body 40. The vent holes 90 are circumferentially spaced apart from each other about the central opening 82. The plug 84 includes a flexible flange 92 that is formed about an outer peripheral surface of the plug 84, and which is positioned to overlap the vent holes 90. As such, the flexible flange 92 comprises a moveable flap that covers the vent holes 90 to prevent lubrication from exiting the chamber 80. The vent holes 90 operate to prevent the lubrication chamber 80 from being pressurized. If pressure within the lubrication chamber 80 exceeds a predetermined limit, the increased air pressure acts to move the flange 92 out of contact with the outboard end face 54 of the body as indicated by arrows 94. This allows the pressurized air to escape to atmosphere. Once the pressure within the chamber 80 falls below the predetermined limit, the flange 92 returns to its original position to cover the vent holes 90.

The body 40 also includes a plurality of bores 96 (FIG. 6) that extend from the inboard end face 56 to the internal lubrication chamber 80. The bores 96 are circumferentially spaced apart from each other about the air inlet 58. The bores 96 are spaced such that they do not intersect the air outlets 52. The retainer 64 includes an enlarged flange portion 98 formed about an outer peripheral surface that at least partially overlaps the bores 96. An outboard surface of the flange portion 98 is axially spaced from the inboard end face 56 of the body. In the event of a seal failure, the bores 96 cooperate with the flange portion 98 to create a labyrinth design to mitigate loss of lubrication. The bores 96 also allow hub lubrication fill to be performed in a center of the wheel unit.

The seal assembly 62 can comprise a completely spherical element such as that shown in FIGS. 3-6 or other seal configurations can also be used. The seal assembly 62 of FIGS. 3-6 comprises a single element 62*a* with an internal bore 62*b* extending therethrough to receive the tube 34. An abutment 62*c* prevents the tube 34 from extending into the second seal 66. The second seal 66 comprises a cup-shaped element with cross-holes that fluidly connect to the air outlets 52. Air flows through the tube 34, into an internal cavity of the second seal 66 and then exits the outlets 52.

Figure 9:
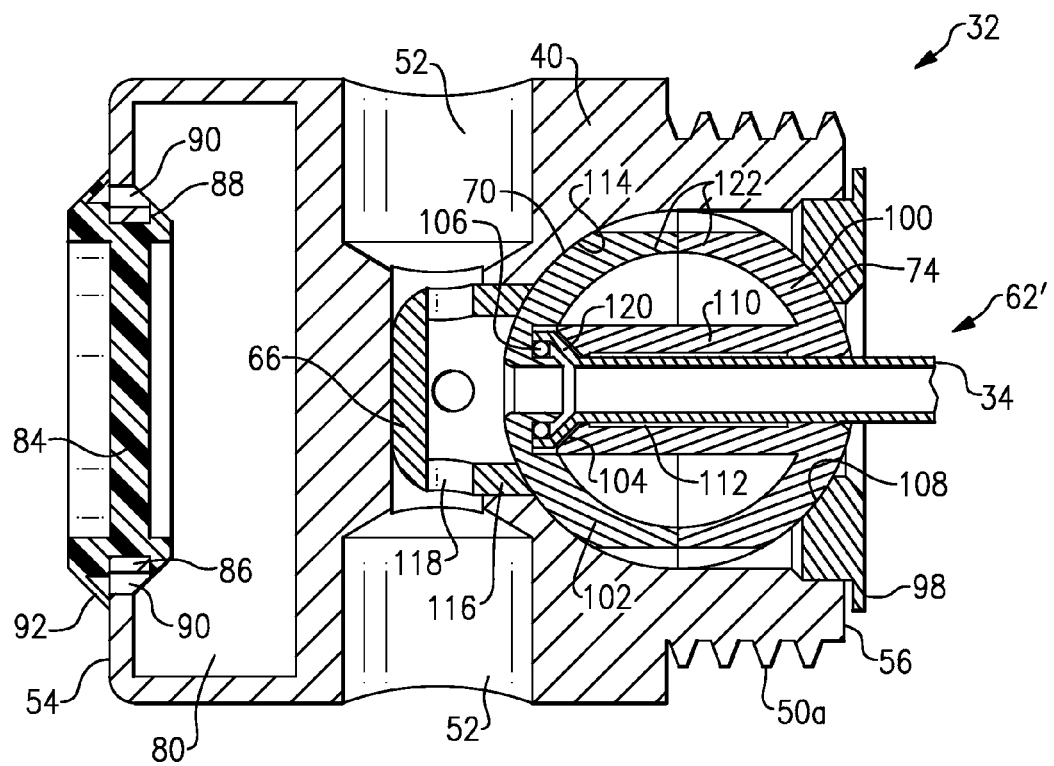
FIG. 9 is a cross-sectional view of the connector of FIG. 7.
Figure 7:
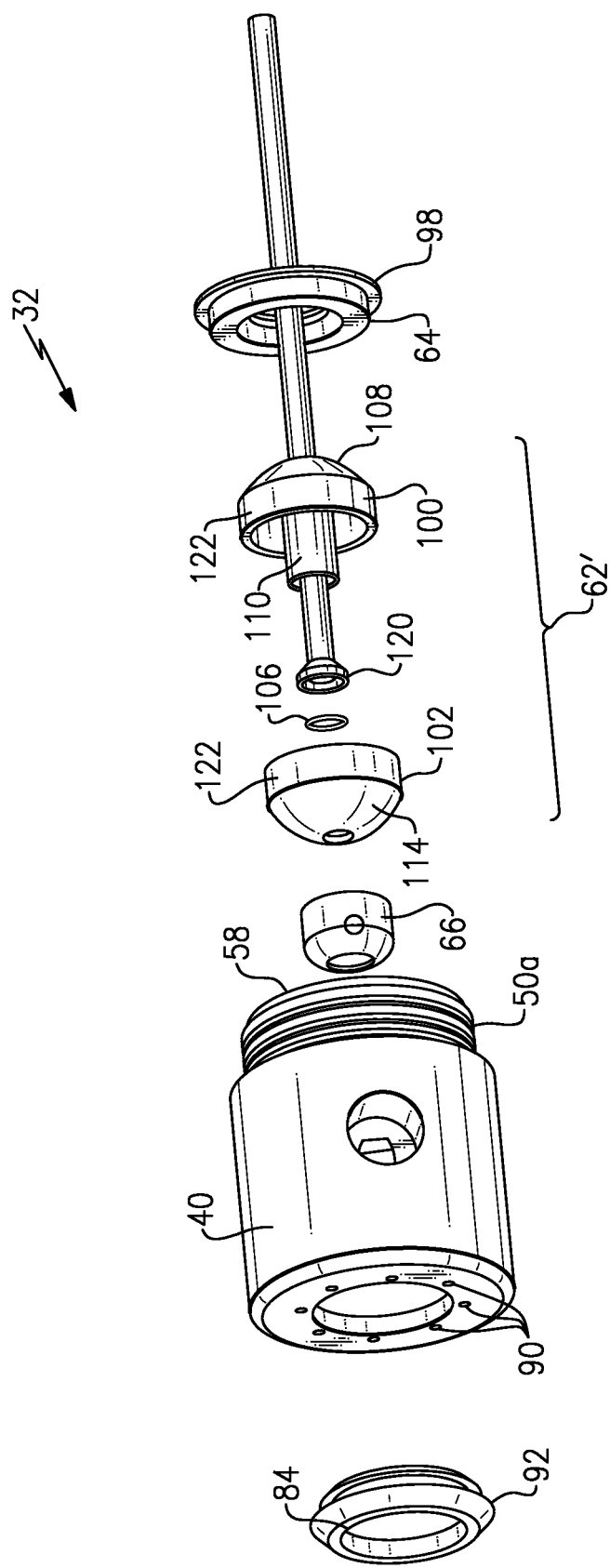
FIG. 7 is an exploded view facing an outboard end of a connector assembly showing one example of a seal.
Figure 8:
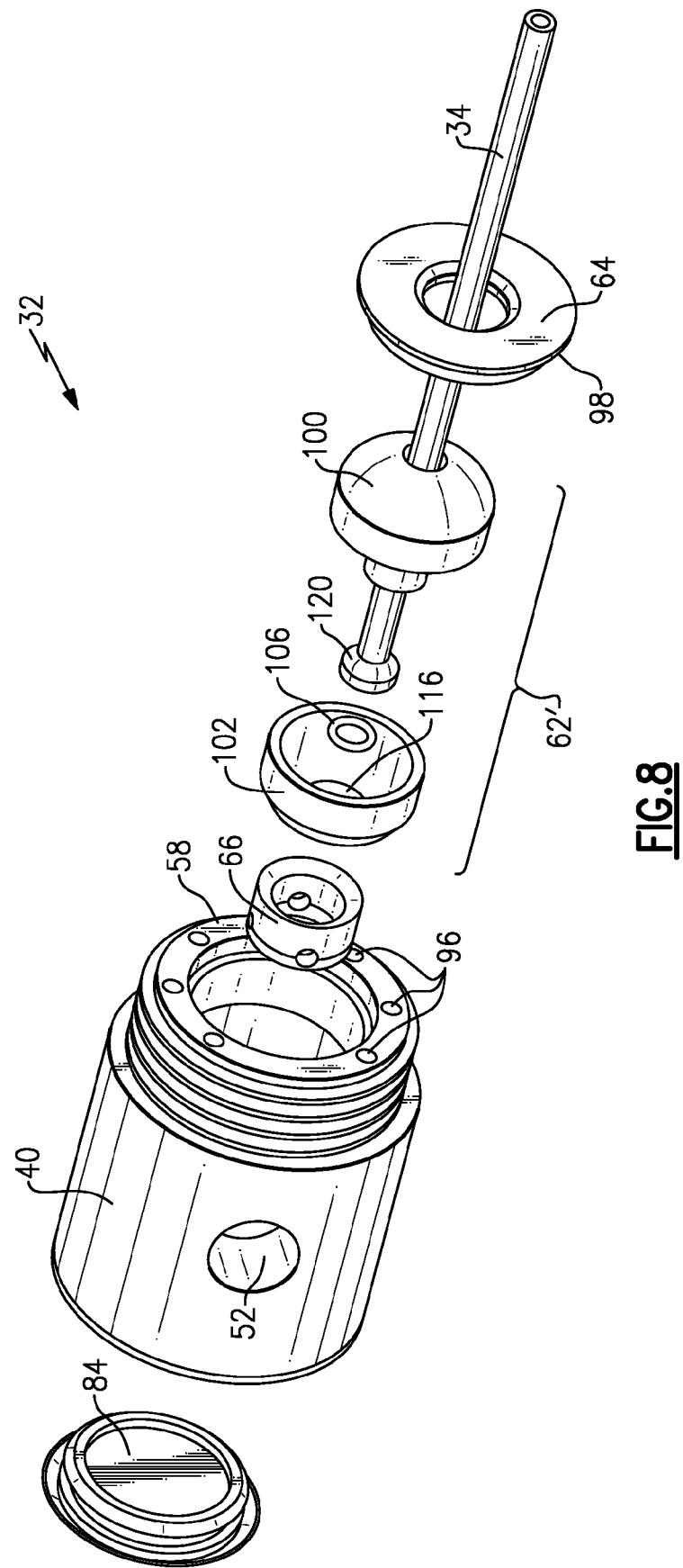
FIG. 8 is an exploded view of the connector of FIG. 7 facing an inboard direction.

FIGS. 7-9 show another example of a seal assembly 62'. The body 40, second seal 66, retainer 64, and plug 84 are the same as that shown in FIGS. 3-6.

The seal assembly 62' in this example comprises a two-piece configuration with a first seal component 100 and a second seal component 102 that are secured together via a snap-fit or other attachment method. The first seal component 100 includes an abutment 104 that retains the tube 34 within a seal body such that the tube 34 cannot be axially disconnected from the seal body. A secondary seal 106 provides a sealed interface for the tube 34 within the seal assembly 62'.

The first seal component 100 comprises a cup-shaped member with a spherical surface 108 that faces the air inlet 58. A cylindrical portion 110 extends axially outwardly from a bottom of a cup-shaped cavity toward the second seal component, i.e. extends in an outboard direction. The cylindrical portion 110 defines an internal bore 112 that receives the tube 34.

The second seal component 102 comprises a cup-shaped member with a spherical portion 114 that abuts against the curved surface portion 70 formed within the internal cavity 60. A cylindrical portion or hub portion 116 extends axially outwardly from a bottom of a cup-shaped cavity toward the first seal component 100, i.e. extends in an inboard direction. The hub portion 116 includes an internal bore 118 that is open to an interior of the tube 34. Air exits the tube 34, passes through the bore 118 and enters the cup-shaped cavity of the seal 66.

In this example, the outboard first tube end 36 of the tube 34 comprises a flared tube end 120. The cylindrical portion 110 of the first seal component 100 terminates at the abutment 104. The flared tube end 120 engages the abutment 104 to prevent the tube 34 from being axially withdrawn from the seal body. The hub portion 116 seats the secondary seal 106 to provide sealing engagement between the flared tube end 120 and the second seal component 102.

In this example, the first and second seal components 100, 102 each include a truncated portion 122, i.e. a cylindrical portion, which extends toward each other. The truncated portion 122 terminates at an abutting contact surface 124 between the two seal components 100, 102. This truncation removes material, which reduces cost.

The ball and socket joint described above overcomes the weaknesses of a traditional thru-tee connection. The ball and socket design allows flexibility to accommodate runout between the hub and the axle. The tube inside the ball may either rotate within the ball within the seal, or can run on the seal in the axle mounted receiving tube. In the event of a seal failure, the vent holes that are partially covered create a labyrinth design to mitigate oil loss. Breather holes perform double duty to allow hub oil filling to be performed in a center of the unit.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A connector for a tire inflation system comprising:
a body including an air inlet receiving pressurized air from an air supply and an air outlet to communicate the pressurized air to at least one tire, said body including an internal cavity connecting said air inlet to said air outlet, said body adapted to be connected to a rotating wheel component;
a seal assembly at least partially received within said internal cavity; and
a tube having a first end supported by said seal assembly and a second end adapted for connection to a non-rotating axle component, said tube communicating pressurized air from the non-rotating axle component to said air inlet, and wherein said seal assembly and said tube are rotatable relative to each other and said seal assembly is rotatable relative to said body.

2. The connector according to claim 1 wherein said seal assembly comprises a seal body including at least one curved surface portion that abuts against a corresponding curved surface portion formed within said internal cavity.

3. The connector according to claim 2 wherein said seal body comprises a spherical component including an internal bore that receives said first end of said tube.

4. The connector according to claim 2 wherein said seal body comprises first and second pieces that are secured to each other, and wherein at least one of said first and second pieces includes an abutment that retains said tube within said seal body such that said tube cannot be axially disconnected from said seal body.

5. The connector according to claim 4 including a secondary seal to provide a sealed interface between said tube and one of said first and said second pieces.

6. The connector according to claim 5 wherein said first piece comprises a cup-shaped member with a first spherical portion that abuts against said curved surface portion formed within said internal cavity and a first cylindrical portion that extends from said first spherical portion toward said second piece, and wherein said second piece comprises a cup-shaped member with a second spherical surface facing said air inlet and a second cylindrical portion that extends from said second spherical portion to abut against said first cylindrical portion of said first piece.

7. The connector according to claim 6 wherein said second piece includes a tubular extension extending from an inner surface of said second spherical portion toward an inner surface of said first spherical portion, said tubular extension receiving said first end of said tube.

8. The connector according to claim 7 wherein said first end of said tube comprises a flared tube end and wherein said tubular extension terminates at said abutment, said flared tube end engaging said abutment to prevent said tube from being axially withdrawn from said seal body.

9. The connector according to claim 8 wherein said first piece includes a hub portion extending outwardly from said internal surface of said first spherical portion, said hub portion seating said secondary seal to provide sealing engagement between said flared tube end and said first piece.

10. The connector according to claim 2 wherein said seal body includes at least one additional curved surface portion and including a retainer having a curved abutment surface that engages said additional curved surface portion, said retainer being coupled to said body to retain said seal body within said internal cavity.

11. The connector according to claim 10 wherein said seal body comprises a first seal body and wherein said seal assembly includes a second seal body that engages said at least one curved surface portion of said first seal body, said at least one curved surface portion including an opening that directs pressurized air from said tube into an internal cavity of said second seal body.

12. The connector according to claim 11 wherein said second seal body comprises a cup-shaped member with at least one side wall opening to communicate pressurized air to said air outlet of said body.

13. The connector according to claim 2 wherein said body includes an internal lubrication compartment positioned outboard of said internal cavity, said body including an outboard end face having a central opening to supply lubrication to said internal lubrication compartment, and wherein said central opening receives a detachable plug to hold the lubrication within said internal lubrication compartment.

14. The connector according to claim 13 including a plurality of vent holes extending from said internal lubrication cavity to said outboard end face, said vent holes being circumferentially spaced apart from each other about said central opening, and wherein said plug includes a flexible flange formed about an outer peripheral surface of said plug, said flexible flange portion overlapping said plurality of vent holes.

15. The connector according to claim 13 wherein said body includes an inboard end face that defines said air inlet, and including a plurality of bores formed within said body and extending from said inboard end face to said internal lubrication compartment to allow lubrication to be directed into said internal lubrication compartment.

16. The connector according to claim 15 wherein said plurality of bores are circumferentially spaced apart from each other about said air inlet, and including a retainer to retain said seal body within said internal cavity, said retainer including an enlarged flange portion formed about an outer peripheral surface that at least partially overlaps said plurality of bores.

17. A tire inflation system comprising:
a non-rotating axle component;
a hub cap mounted for rotation relative to said non-rotating axle component about an axis;
a connector connected to said hub cap, said connector including an air inlet, an air outlet, and an internal cavity interconnecting said air inlet and said air outlet to communicate pressurized air to at least one tire via said air outlet;
a seal assembly at least partially received within said internal cavity; and
a tube having a first end supported by said seal assembly and a second end adapted for connection to said non-rotating axle component, said non-rotating axle component being coupled to an air supply, and wherein said tube communicates pressurized air from said non-rotating axle component to said air inlet, and wherein said seal assembly and said tube are rotatable relative to each other and said seal assembly is rotatable relative to said connector.

18. The tire inflation system according to claim 17 wherein said connector includes an internal lubrication compartment positioned outboard of said internal cavity, said connector including an outboard end face having at least one opening to supply lubrication to said internal lubrication compartment, and wherein said at least one opening receives a detachable plug to hold the lubrication within said internal lubrication compartment.

19. The tire inflation system according to claim 18 wherein said connector includes a plurality of vent holes extending from said internal lubrication cavity to said outboard end face, said vent holes being circumferentially spaced apart from each other about said at least one opening, and wherein said plug includes a flexible flange formed about an outer peripheral surface of said plug, said flexible flange portion overlapping said plurality of vent holes.

20. The tire inflation system according to claim 19 wherein said connector includes an inboard end face that defines said air inlet, and including a plurality of bores formed within said connector and extending from said inboard end face to said internal lubrication compartment to allow lubrication to be directed into said internal lubrication compartment, and wherein said plurality of bores are circumferentially spaced apart from each other about said air inlet, and including a retainer to retain said seal assembly within said internal cavity, said retainer including an enlarged flange portion formed about an outer periphery of said retainer, said enlarged flange portion at least partially overlapping said plurality of bores.

21. The tire inflation system according to claim 17 wherein said seal assembly comprises a seal body including at least one curved surface portion that abuts against a corresponding curved surface portion formed within said internal cavity, and wherein said seal body comprises first and second pieces that are secured together, and wherein at least one of said first and second pieces includes an abutment that retains said tube within said seal body such that said tube cannot be axially disconnected from said seal body.

\* \* \* \* \*